(12) United States Patent
Robbins et al.

(10) Patent No.: US 9,111,459 B2
(45) Date of Patent: Aug. 18, 2015

(54) CLASSROOM RESPONSE SYSTEM

(76) Inventors: Steven Robbins, San Antonio, TX (US); Kay Robbins, San Antonio, TX (US)

( * ) Notice: Subject to any disclaimer, the term of this patent is extended or adjusted under 35 U.S.C. 154(b) by 32 days.

(21) Appl. No.: 13/821,739

(22) PCT Filed: Sep. 9, 2011

(86) PCT No.: PCT/US2011/051103
§ 371 (c)(1),
(2), (4) Date: Mar. 8, 2013

(87) PCT Pub. No.: WO2012/034086
PCT Pub. Date: Mar. 15, 2012

(65) Prior Publication Data
US 2013/0164725 A1    Jun. 27, 2013

Related U.S. Application Data

(60) Provisional application No. 61/381,436, filed on Sep. 9, 2010.

(51) Int. Cl.
*G09B 7/00* (2006.01)
*G09B 5/14* (2006.01)
(52) U.S. Cl.
CPC ... *G09B 5/14* (2013.01); *G09B 7/00* (2013.01)

(58) Field of Classification Search
CPC .......................................................... G09B 7/07
USPC .................................. 434/322, 323, 336, 350
See application file for complete search history.

(56) References Cited

U.S. PATENT DOCUMENTS

| | | | |
|---|---|---|---|
| 2004/0153504 A1* | 8/2004 | Hutchinson et al. | 709/204 |
| 2006/0015814 A1* | 1/2006 | Rappaport et al. | 715/733 |
| 2006/0141441 A1* | 6/2006 | Hutchinson et al. | 434/350 |
| 2006/0293048 A1* | 12/2006 | Swanson et al. | 455/426.1 |
| 2006/0294552 A1* | 12/2006 | Swanson et al. | 725/80 |
| 2009/0043909 A1* | 2/2009 | Patton et al. | 709/232 |
| 2009/0083638 A1* | 3/2009 | Gupta | 715/752 |
| 2009/0148824 A1* | 6/2009 | Argott | 434/307 R |
| 2010/0178645 A1* | 7/2010 | Ieperen et al. | 434/323 |
| 2012/0270201 A1* | 10/2012 | Cacioppo et al. | 434/351 |

* cited by examiner

*Primary Examiner* — Bruk Gebremichael

(57) ABSTRACT

A classroom response system is disclosed, comprising a classroom response system (CRS) server, at least one instructor console, and at least one student console. The CRS server includes a plurality of software modules, including a runtime server, a master server, a simulator, a query editor, a report generator, a report editor, a seating chart tool, and a simulator. An optional secondary instructor console may be provided, for example for use by a instructor's assistant. In use, the instructor may use the CRS to keep track of attendance, pose questions to students, and receive answers, including open-ended answers. Students may also be allowed to evaluate one another's work. The instructor may display aggregated answers and other anonymous data.

13 Claims, 6 Drawing Sheets

EXEMPLARY
INSTRUCTOR
CONSOLE GUI
410

EXEMPLARY
STUDENT
CONSOLE GUI
510

𝓕𝓘𝓖. 5

EXEMPLARY
QUERY CREATOR
GUI
610

CLASSROOM RESPONSE SYSTEM

CROSS REFERENCE TO RELATED APPLICATIONS

This application claims priority to U.S. Provisional Application 61/381,436, entitled "Classroom Response System," filed on Sep. 9, 2010, which is/are incorporated herein by reference.

BACKGROUND OF THE INVENTION

This specification relates to the field of technological education systems and more particularly to a network-centric classroom response system.

Prior art systems sometimes called "clickers" enable a plurality of students or members of another audience to provide answers to multiple-choice questions. For example, each "clicker" may have 5 buttons, and the instructor may ask students to select one of five options. Aggregated data of all answers received may then be displayed to the class.

SUMMARY OF THE INVENTION

A classroom response system is disclosed, comprising a classroom response system (CRS) server, at least one instructor console, and at least one student console. The CRS server includes a plurality of software modules, including a runtime server, a master server, a simulator, a query editor, a report generator, a report editor, a seating chart tool, and a simulator. An optional secondary instructor console may be provided, for example for use by a instructor's assistant. In use, the instructor may use the CRS to keep track of attendance, pose questions to students, and receive answers, including open-ended answers. Students may also be allowed to evaluate one another's work. The instructor may display aggregated answers and other anonymous data.

DETAILED DESCRIPTION OF THE EMBODIMENTS

A classroom response system (CRS) is a hardware and software solution for providing rich interactive instruction in a classroom or classroom-like environment.

A CRS will now be described with more particular reference to the attached figures. The figures are provided by way of one or more exemplary embodiments only, and are not intended to limit the scope of the appended claims.

1. Hardware and Software Configuration

Figure 1:
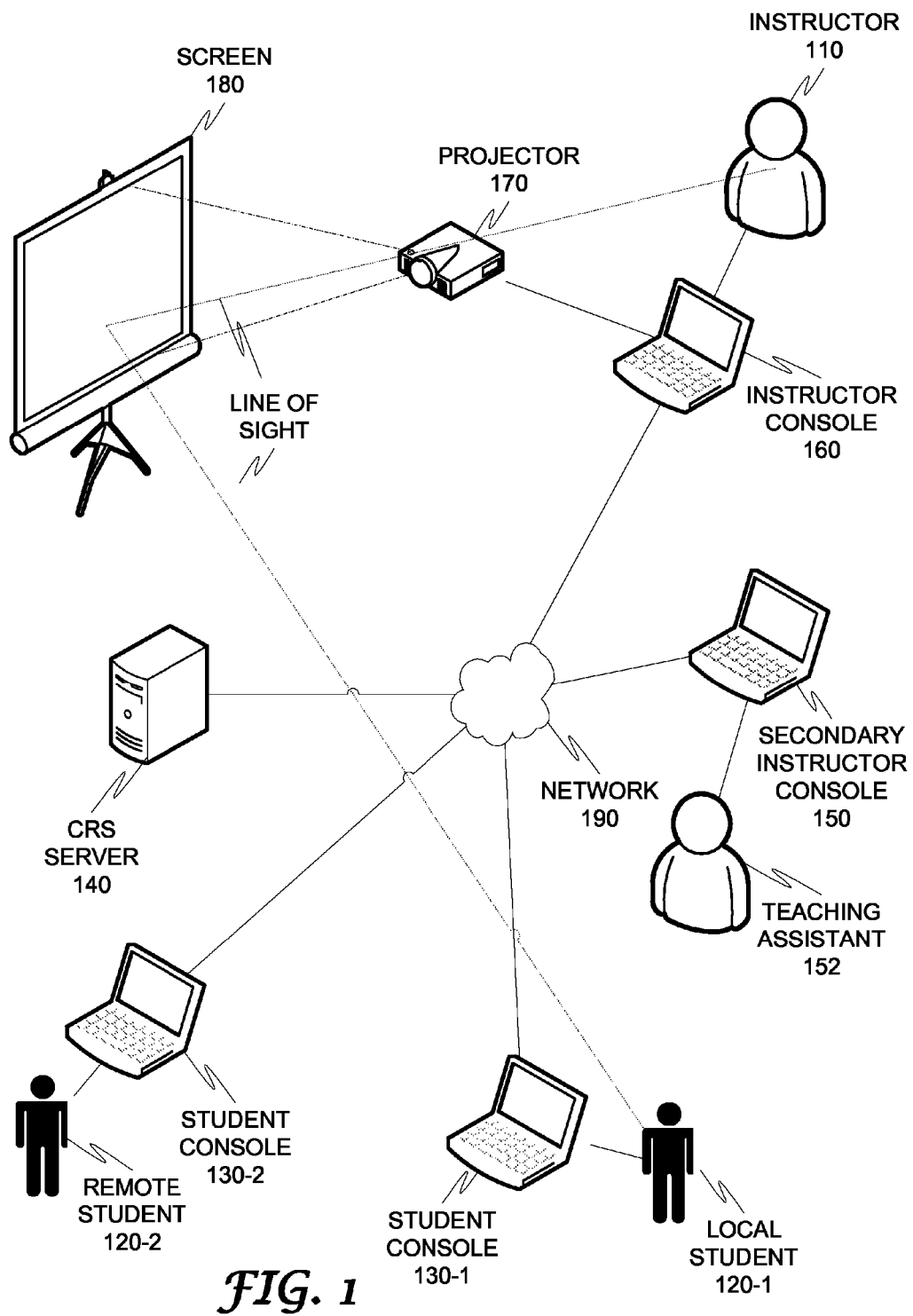
FIG. 1 is a network-level drawing of a classroom response system.

FIG. 1 is a network-level diagram of a CRS 100. CRS 100 is provided to enable an instructor 110 to interact with a plurality of students 120, including local student 120-1, and remote student 120-2. Instructor 110 interacts with an instructor console 160. Any of the consoles disclosed in this specification may be, by way of non-limiting example, a desktop computer, laptop computer, tablet computer, smartphone, or other network-enabled computing device. Local student 120-1 interacts with a student console 130-1, and remote student 120-2 interacts with a student console 130-2. Optionally, a teaching assistant 152, or other secondary instructor may be provided. Teaching assistant 152 interacts with a secondary instructor console 150.

Instructor console 160, secondary instructor console 150, student console 130-1, student console 130-2, and secondary instructor console 150 may be generically referred to as CRS consoles. CRS consoles connect to a network 190, which may be for example a LAN, WAN, WiFi, the internet, or other suitable network infrastructure. Network 190 communicatively couples each of the foregoing consoles to CRS server 140. In the exemplary embodiment, CRS server 140 provides the software for operating CRS 100, while CRS consoles provide runtimes for instructor 110, students 120 and secondary instructors 152 for interacting with CRS server 100.

Instructor 110 and local student 120-1 may be commonly located, such as in the same classroom. Both instructor 110 and local student 120-1 may have a direct line of sight to screen 180, which may be, for example, a monitor, overhead projector, or other projection screen. Instructor 110 can send images to a projector 170 to be displayed on screen 180. Teaching assistant 152 may either be located with instructor 110 and local student 120-1, or may be located elsewhere. In some embodiments, teaching assistant 152 may be enabled to monitor several sections of a course simultaneously. Remote student 120-2 may also be located outside of the classroom. For example, remote student 120-2 may be a distance-learning student. In cases where some of the participants are located outside of the classroom, a dual display may be provided. For example, remote student 120-2 and teaching assistant 152 may have a split display, with one section showing software modules of CRS 100, and with another display showing the image provided by projector 170 to screen 180. Thus, remote participants such as remote student 120-2 and teaching assistant 152 will be enabled to view all of the available material.

Figure 2:
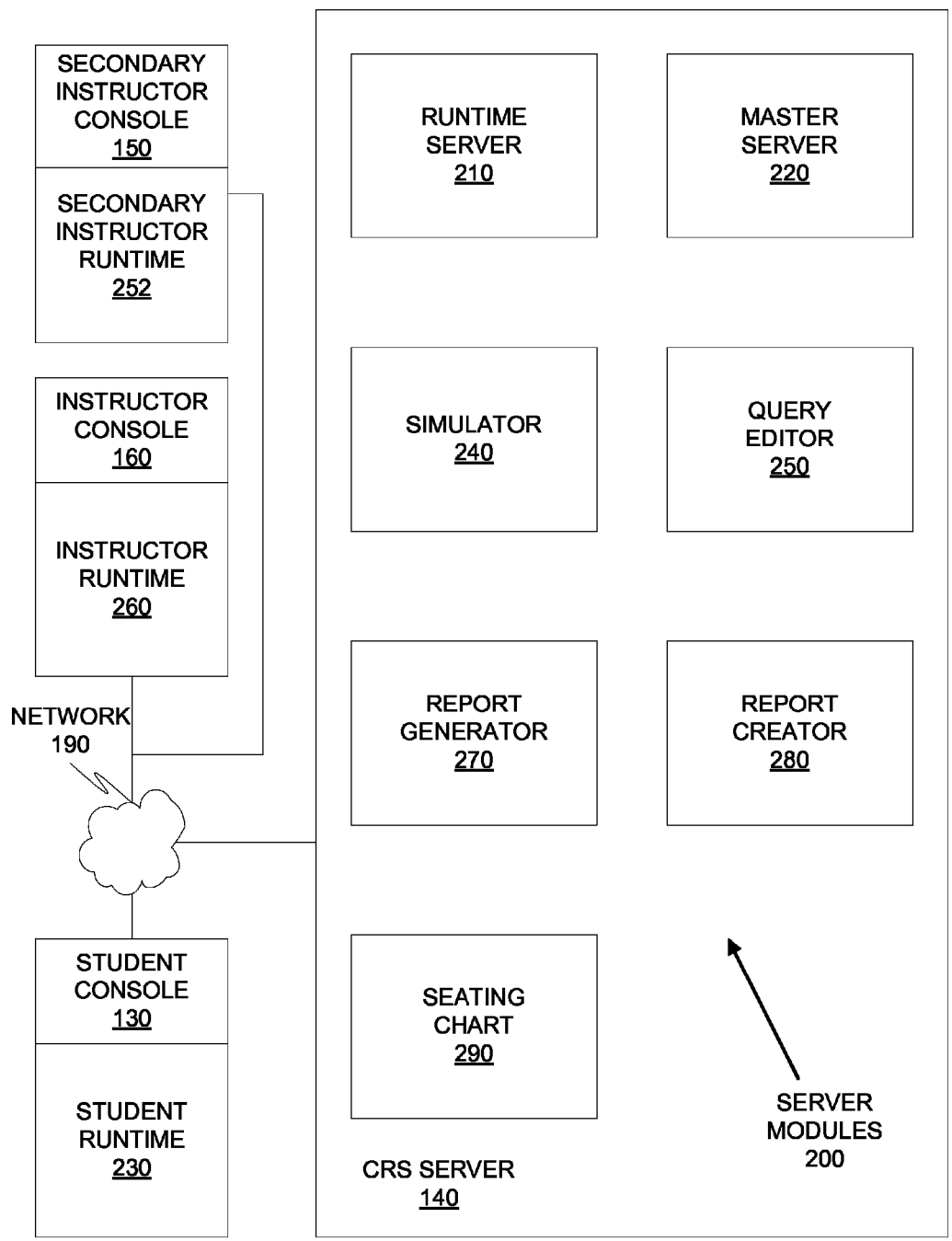
FIG. 2 is a block diagram of a classroom response system.

FIG. 2 is a block diagram of a CRS 100. This figure shows logical divisions, but actual physical implementation can vary. For example, a plurality of server modules 200 are shown residing on CRS server 140, but these modules do not need to all be hosted on the same physical hardware and software platform. Furthermore, in some embodiments, some or all of software modules 200 can be hosted on the same hardware as instructor console 160.

In the embodiment of FIG. 2, a plurality of CRS consoles, including instructor console 160, student console 130 and secondary instructor console 150 are communicatively coupled to a CRS server 140

1.1. Hardware Implementation

Figure 3:
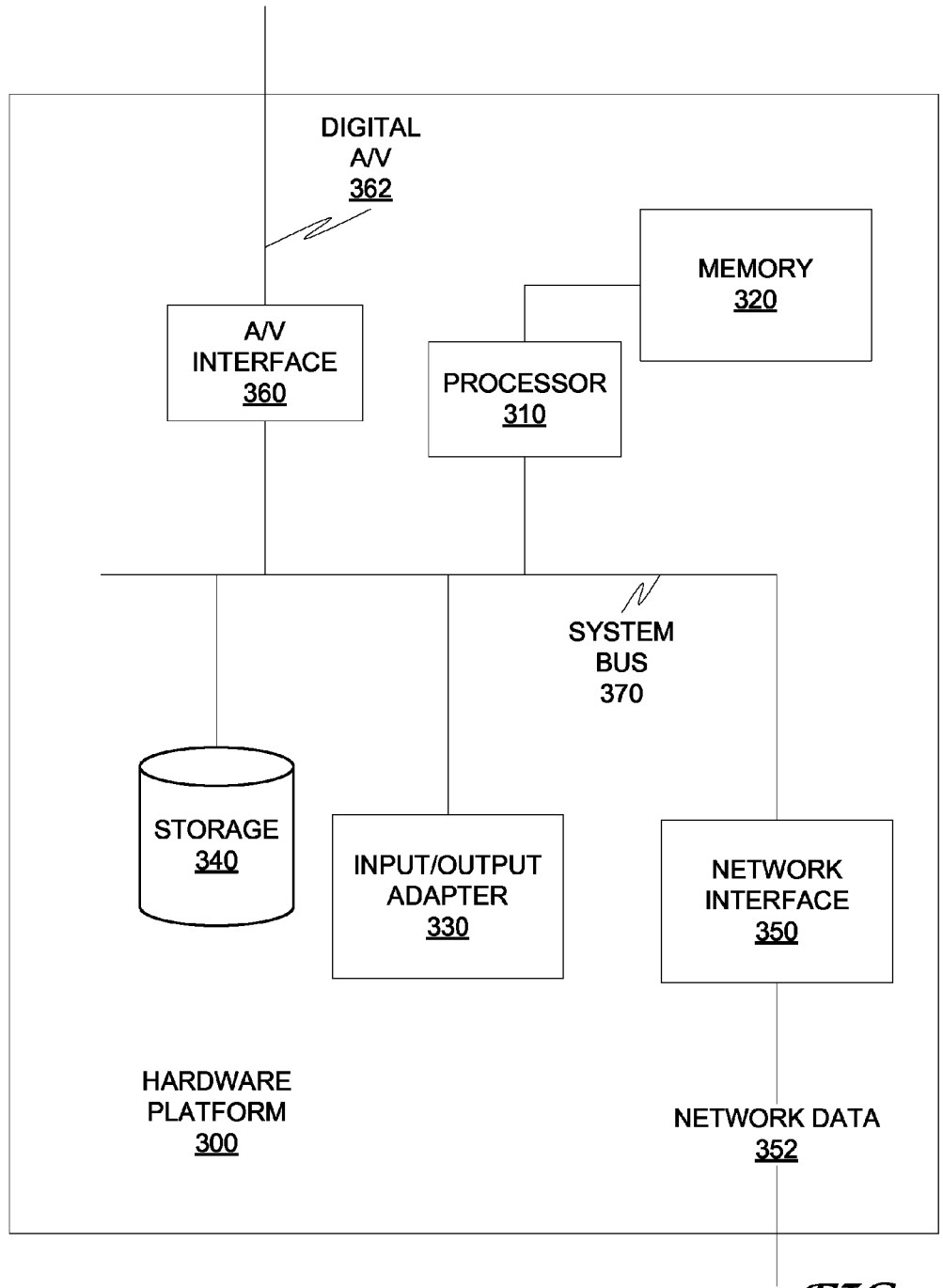
FIG. 3 is a block diagram of a hardware platform which may be suitable for use as a CRS server, or as a CRS console.

FIG. 3 is an exemplary embodiment of a hardware platform 300 suitable for use as a CRS console, or as a CRS server 140. Hardware platform 300 is controlled by a processor 310, which may be a CPU, FPGA, PLA, microcontroller, or other suitable programmable logic device. Processor 310 is communicatively coupled to a memory 320. In the disclosed embodiment, memory 320 and processor 310 are communicatively coupled in a direct memory access configuration to provide low-latency communication. Memory 320 maybe random access memory, or other suitable low latency storage technology. In some embodiments, memory 320 is a volatile memory technology. Processor 310 connects to other hardware complements via system bus 370. A storage 340 is communicatively coupled to processor 310. Storage 340 may be a nonvolatile memory technology, and in many embodiments has higher latency than memory 320. In some configurations, the functions of storage 340 and memory 320 may be combined in a single physical device. Processor 310 is also communicatively coupled to an input/output adapter 330. Input/output adapter 330 allows for interaction between hardware platform 300 and a human user. For example, the human user can interact with hardware platform 300 via conventional means such as a keyboard, mouse, speakers, monitor, touchpad, or other input/output technology known in the art. Processor 310 is also communicatively coupled to a network interface 350, which sends and receives network data 352, for example to network 190. Network interface 350 may provide either wired or wireless network connectivity, including ethernet, USB, WiFi, Bluetooth, infrared, or other networking technologies known in the art. Processor 310 may also be communicatively coupled to an audio/video interface 360. Audio/video interface 360 may in some cases be combined in a single physical device with input/output adapter 330. Audio/video interface 360 may be configured to handle digital audio/video signal 362, for example to drive projector 170, or to receive video sent to projector 170. In some cases, audio and video streams may also be provided over network interface 350.

1.2. CRS Consoles

CRS consoles have a processor and a memory, and stored in the memory is a runtime. For example, instructor console 160 has an instructor runtime 260, student console 130 has a student runtime 230, and secondary instructor console 150 has a secondary instructor runtime 252. In an exemplary embodiment, each runtime is a cross-platform, standalone program written for example in Java that includes a graphical user interface (GUI) as well as communication infrastructure.

Alternative embodiments of the CRS consoles may been implemented. For example, student console 130 may be a Java Applet that runs in a web browser and requires a student login, or student console 130 may be implemented as an application for a smart phone.

1.2.1. Instructor Console

Instructor console 260 allows instructor 110 to view the status of a plurality of students 120 (logged in or not), create and deliver questions, perform reviews, send and receive messages, and display student responses as anonymous summaries or keyed to each student. In an exemplary embodiment, the instructor 110 provides formatted questions, with formatted questions being selected from the group consisting of true/false, multiple choice (radio button style selections), multiple selection (checkbox style selections), open answer, and writing exercise. Instructor console 160 also allows instructors 110 to deliver multiple-choice, short answer, open-ended essay, or computer coding questions to students either during a class or at another time. Instructor 110 can display all of the class responses simultaneously on projection screen 180—either identified by student or anonymously to allow discussion while preserving student privacy.

Through instructor console 160, instructor 110 can send messages to individual students 120 or to groups of students 120 and receive their responses. Instructor 110 can also set up collaborative groups of students to work on problems. Instructor 110 can also write reviews of individual student answers. CRS 100 optionally allows a secondary instructor console 150 that may or may not have restricted privileges. Secondary instructor console 150 may allow other instructors or teaching assistants 152 to see and write reviews for individual student answers as well as to deliver questions to students.

Instructor console 160 can also be run remotely from another computer on or off campus, allowing real-time remote interaction from instructors 110 who are away from campus at the time of class or from teaching assistants 152 who have been enlisted to give real time feedback on student responses.

CRS 100 allows a single instructor 110 or teaching assistant 152 to run multiple instructor consoles 160 associated with different classes that are going on simultaneously. For example, it is possible to have a teaching assistant 152 monitor multiple sections simultaneously and provide reviews from a remote location.

1.2.2. Student Console

Student console 230 allows students 120 to respond to questions delivered by the instructor 110. CRS server 140 may also provide a cooperative mode for student consoles 130. In cooperative mode, a plurality of students 120 share a response window with other members of their group. The answer that the group submits is credited to all of the students in the group. Cooperative mode also includes a chat window for members of the group.

If instructor 110 enables student reviews, students 120 who finish responding to a question early may see and review responses from other students 120. Answers for review may be selected in an equalized random fashion and displayed anonymously. After completing one review, a student 120 is free to request another response to review. Students whose answers have been reviewed can see the reviews. Optionally, the reviewer's anonymity may also be preserved.

1.2.3. Secondary Instructor Console

Secondary instructor console 150 is similar to instructor console 110, but certain features may be restricted, depending on the specific tasks that instructor 110 has assigned to secondary instructor 152.

1.3. Server Modules

In the exemplary embodiment, CRS server 140 provides the following software modules.

1.3.1. Runtime Server

Runtime server 210 handles all of the underlying communication between CRS consoles as well as the logging of interactions. Runtime server 210 is responsible for receiving and forwarding all messages between instructor console 160 and student console 130. Runtime server 210 is multi-threaded and maintains the complete internal state of the class session. All changes in state are recorded to a log file, which allows the server to be restarted later to start a session where it left off at the end of the class period. Runtime server 210 also records relevant reporting information in an XML file for later report generation.

Runtime server 210 may be started and stopped automatically, for example, using cron or other operating system utility to schedule periodic running of the runtime server 210. In an exemplary embodiment, runtime server 210 is scheduled to start approximately 10 minutes before class begins and run until 15 minutes after the class ends.

1.3.2. Master Server

Master server 220 may be configured to run continuously on CRS server 140. Master server 220 allows for remote access to the log files created by runtime server 210 and can be used to send reports via email. Simulator 240 may interface with master server 220 to resume a previous CRS session. Report creator 280 and report generator 270 may access master server 220 to retrieve log files and to send email reports. Master server 220 may implement security and authentication mechanisms known in the art. The CRS Master Server is meant to run all of the time on the same host that runs the CRS server.

1.3.3. Simulator

Simulator 240 may be a standalone program, which may be hosted on CRS server 140, instructor console 260 or secondary instructor console 150. Simulator 240 allows instructor 110 to run a full simulated system (including a CRS server 140, multiple instructor consoles 160, secondary instructor consoles 150 and multiple student consoles 130) on a single machine. Simulator 240 allows testing of CRS 100 as a full system, training of instructors 110 in how to use CRS 100, and testing of questions and the accuracy of seating charts. In addition, the simulator 240 can be started with an internal CRS log file from a previous class period to recreate the state of the class at any point during the period. This capability allows instructor 110 to perform additional operations such as reviewing answers after class has ended sending individual messages to a student 120 that will appear in the student's individualized report.

1.3.4. Query Editor

Query editor 250 provides an intuitive GUI for instructor 110 to enter questions and display how they will look to the students 120. An overall display window allows instructor 110 to perform operations such as changing the order of questions. Previously saved files of questions can be loaded and inserted into the current session allowing banks of questions to be combined and rearranged in convenient ways.

1.3.5. Report Generator

Report generator 270 provides a GUI interface to the reporting features of the master server 220. It allows the user to generate, display, save, and distribute reports. In an exemplary embodiment, eight types of reports are supported. Five types are meant solely for use by instructors:

1. Attendance Summary;
2. Participation Summary;
3. Single Log Summary;
4. Query Report;
5. Report Report.

Three types of reports large for use by both instructors and students, with each student receiving a report about that student's CRS experience. These reports are:

1. Student Attendance;
2. Student Participation;
3. Student Report.

Instructors can obtain compendium reports, which are consolidating reports of multiple students or class sessions. They can also receive reports that have been anonymized for analysis.

1.3.6. Report Creator

Report creator 280 provides a batch interface to the report features of master server 220. Report creator 220 can create the same types of reports as report generator 270, but report creator 280 uses a configuration file to determine which reports are generated and how they are distributed. Report creator 280 may be run automatically after each class. Two types of configuration files are supported. The "Today" configuration file is used if it exists. After it is used, the "Today" configuration file is deleted. A "Default" configuration file is used if there is no "Today" configuration file. Instructor console 160 can be used to send either type of file to CRS server 140, allowing instructor 110 to modify the next, or all future report generations without needing to access the CRS server 140 directly. For example, a dedicated e-mail address can be provided and electronically monitored, such as "default-config@crs-host." Any time an e-mail is received at that address from the instructor's e-mail address and including a text file attachment, the text file attachment is used to replace the default configuration file. Any e-mails received at the address that do not meet these conditions are ignored.

1.3.7. Seating Chart

Seating chart 290 permits instructor 110 to make a custom seating chart, which can be linked to pictures and biographical information for students. For example, seating chart 290 may display the classroom seating arrangement and the names of students 120, with each seat hyperlinked to additional information about the student. Instructor 110 can interrogate the seating chart to view all of the responses that a particular student has provided during the class period. As an additional feature, for multiple choice or multiple selection questions, seating charg 290 can provide a color coded indicator for student answers. For example, in the exemplary GUI 410 of FIG. 4, a multiple selection question was posed, asking the students which types of loops they are comfortable coding. Student 26 indicated that he is comfortable coding all three types of loops, student 13 answered that he is comfortable coding both wile loops and do loops, and student 1 indicated that he is comfortable coding only for loops.

2. Additional Features

The following additional features may be provided in one or more exemplary embodiments of a CRS 100.

2.1. Survey Feature

In delivering questions of any complexity, some students will answer quickly, while others will take more time. Instructors have to wait until most students have a chance to finish before discussing the answers. The CRS Survey Feature allows instructors to group questions as a survey. Students can answer questions within the survey as quickly as they choose without intervention from the instructor. Students can revisit questions or skip ahead. Instructors can monitor student progress and display the summarized responses of any question asynchronous to student progress. This capability allows instructors to monitor student progress through the survey and to provide hints at points where they see students are having difficulty as indicated by a significant number of incorrect answers.

2.2. Start Discussion Feature

In some embodiments, students can change their answers at any time. But this may allow students to change answers after the instructor discusses the correct answer. Instructors may thus be unable to determine whether a student gave a correct answer on his or her own, or just parroted the instructor's discussion. The Start Discussion Feature allows the instructor to place an event in the log indicating the point at which discussion started. The reporting software of master server 220 recognizes this event and reports student answers as the last modification before the start discussion event. The student is free to add additional information after the event, and the report generator indicates these as notes. Thus, students can use the student console to take notes, which are emailed to them after the class.

2.3. Annotation Feature

The instructor annotation feature allows instructors to include an overall annotation for each question at the time the question is created. Instructors usually give the correct answer as an annotation (usually prefaced by the words "CORRECT ANSWER"). The annotation appears as a comment in the log. Instructors can also annotate individual answers of multiple-choice questions. This feature is often used to provide an explanation of why a particular answer is incorrect.

2.4. Student Review Feature

The Student Review Feature allows students to review other students' work. When a instructor enables the Student Review Feature, a review link button appears on the student's console. After the student submits an answer to a question, he or she can click on the review link button to get another student's answer to review. The runtime server assigns reviews in a prioritized, but random fashion to assure that each response receives roughly the same number of reviews.

Optionally, both the reviewer and the student being reviewed remain anonymous to each other.

Students can do as many reviews as they have time for, so students who know the material well and work quickly can do multiple reviews before the students who work more slowly have answered the question. A student can display all of the reviews of his or her work and may modify his or her response based on the reviews. The review feature is particularly useful for implementing peer editing of technical writing for students with weak writing skills. It is also useful for code reviews in programming classes. The instructor can display the answers and the reviews in a compact form on the classroom screen and comment on them or use them as a basis for further discussion.

The instructor or an assistant may also review answers, including selecting particular students to review. Assistants do not need to be in the classroom to produce real-time reviews during the class period. The assistant can be at a networked computer on or off campus.

2.5. Message Feature

The Message Feature allows instructors to send a message to an individual student or a group of students by clicking on their names from a list or on seat positions on the seating chart. The message appears on the top of the student window and requires an acknowledgment. Instructors can use this feature to give hints to individual students whose responses indicate incorrect understanding. Students are often tempted in a networked classroom to surf the web. The Message Feature allows the instructor to correct a student privately. In some embodiments, a student is required only to acknowledge a message by clicking an "OK" button. In other embodiments, students may enter a response. This flexibility allows an instructor to ask individual questions of students such as why they had missed class or why they didn't hand in an assignment without embarrassing the student in front of the class.

Messages also have a pending feature, so if a student isn't logged in at the time that the instructor sends the message, the message remains pending until the student logs in. Messages, whether pending or not, appear in the report log. The instructor can send the same message to multiple students.

2.6. Request Help Feature

If enabled by the instructor, a student can send a help request. The CRS instructor console can display a continuously updated list of help requests with student names and seat numbers, allowing instructors or assistants to monitor requests. The help requests can be monitored by an instructor or an assistant, who can respond either by sending a message or by visiting the student at his or her seat. The Request Help Feature encourages students who are easily embarrassed to get assistance unobtrusively. The Request Help Feature also serves as an early warning system for instructors when students are struggling and more class explanation is required. In some embodiments, the instructor may also forward help requests to highly-capable students.

2.7. Greeting Feature

The Greeting Feature increases the utility of CRS reports as a studying aid. The CRS report generator inserts greetings at the beginning of the email that is sent to each student. This allows instructors to insert instructions at the beginning of each report. Instructors might include the assignment for the following class, a reminder of due dates, and admonishment to watch out for a particularly tricky point or other information. Instructors can upload a greeting text file anytime during the class session or they can insert a greeting after the fact into the XML log.

2.8. Rapid Instructor Review Feature

The Rapid Instructor Review Feature allows instructors to quickly provide feedback to a large number of students so that they can refine their answers. When an instructor turns on the Rapid Instructor Review Feature, links appear to the left of each student response indicating correct or incorrect. The instructor simply clicks one of the links and the student immediately receives the correct or incorrect indication. The instructor has the option of writing a comment as part of the review in addition to marking the answer correct or incorrect.

2.9. Shares Feature

The Share Feature allows instructors to set up groups of students to work together either by explicitly assigning students to groups or by assigning students at random based on parameters such as number of groups or group size furnished by the instructor. Creating shares causes the student to get a Share Window that is comprised of a shared editing area and a chat window. CRS assigns one member of the group to be the group leader. The instructor can reorganize groups and change the leader after the groups have been created. When students submit their work, the answers are credited to all of the students in the report generator.

2.10. Report Configuration Feature

The Report Configuration Feature allows instructors to include a configuration file in their CRS home directories. When an instructor starts the CRS instructor console, this file is automatically sent to the CRS Server by the instructor console and included in the report log file. The instructor can use this file to override the default report configuration so that the instructor can change the report for a particular class period. For example, suppose that an instructor did not wish to send daily emails to students with their individual reports for each class, but rather wanted to have a consolidated report that included the logs that covered the material for an exam. The instructor could set up the CRS system so that the default did not send individualized student reports. At some appropriate time, the instructor could move a report configuration file in his or her CRS home directory to reflect this reporting change.

2.11. Grading Feature

Most queries can be assigned a maximum grade value. Queries of type choice, checkbox, or integer can be automatically graded by assigning point values to various answers. These and other types of queries can be graded by a instructor or assistant. Freeform and choice queries can be set to allow student grading. Using the student Review Feature, students can assign grades to individual answers. The assigned grade for a response is the average of all grades given by students who review that response. Grades assigned by a instructor and assistant override any grades assigned by students. When a instructor marks a response as correct, that response is assigned the maximum point value.

2.12. Generic Response Feature

For choice, checkbox, or integer queries, a review or grade given to a response applies to all students who gave the same response.

3. Graphical User Interface

Figure 4:
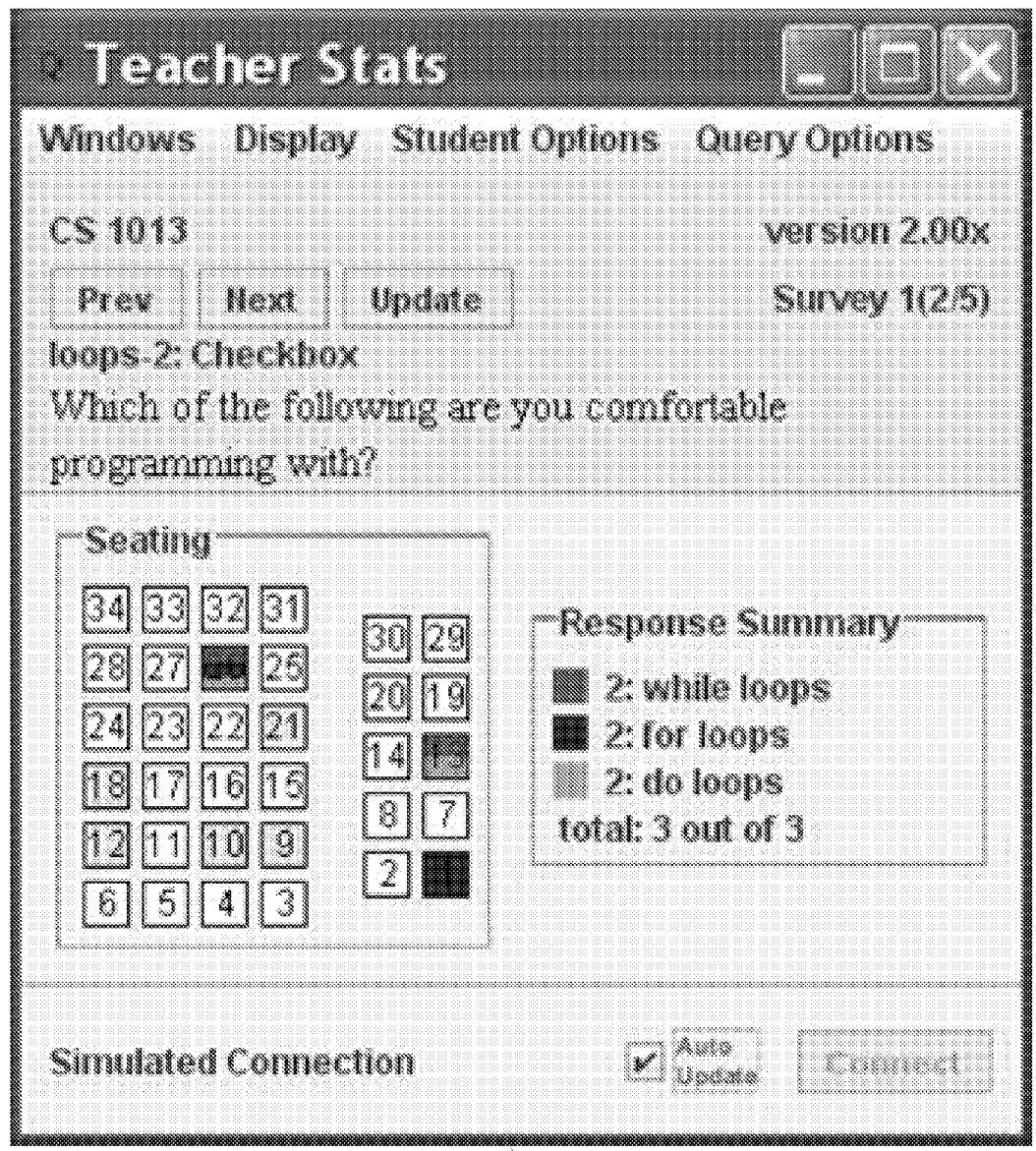
FIGS. 4-6 are line drawings of exemplary user interface screens of a classroom response system.
Figure 5:
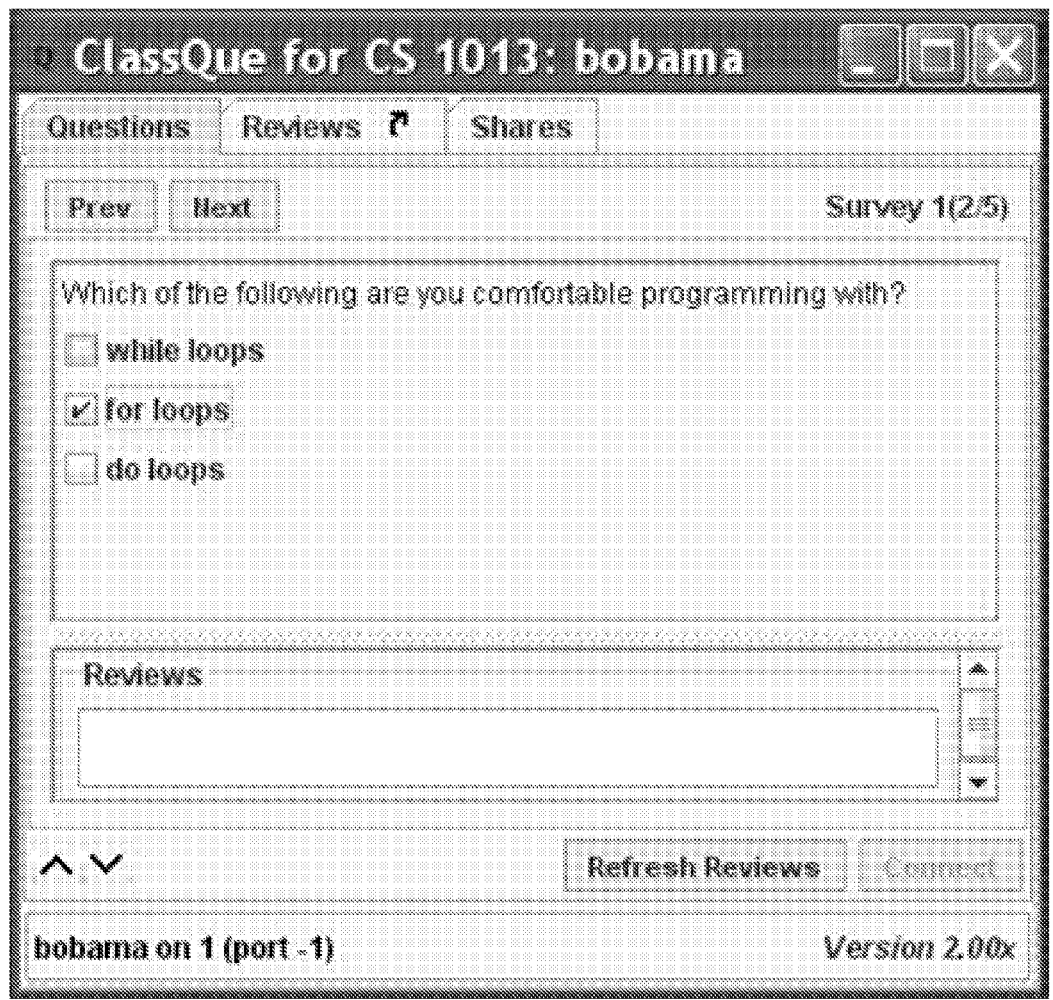
Figure 6:
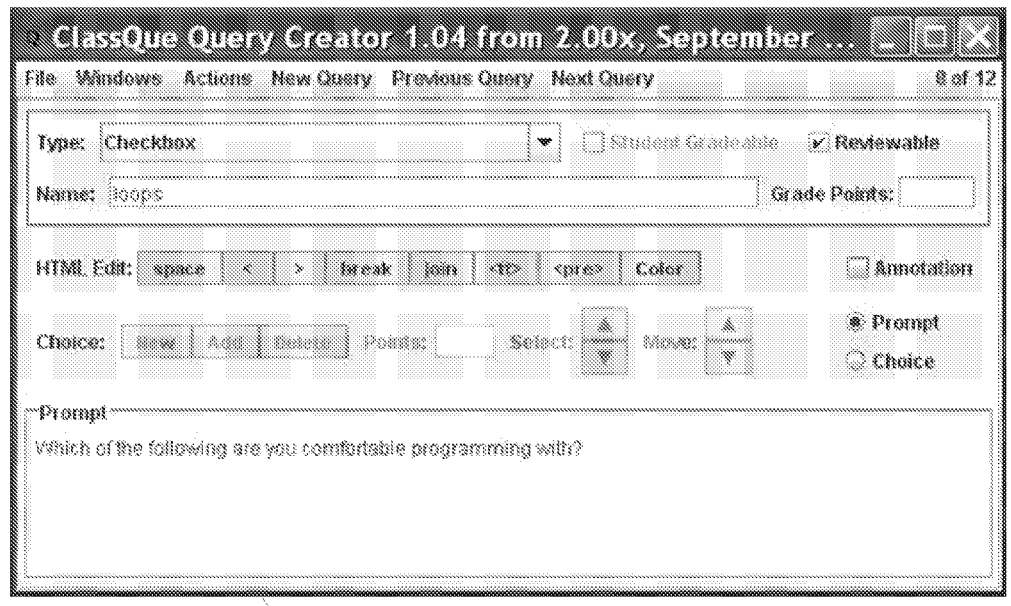

Runtime programs on CRS consoles may be provided as graphical user interfaces (GUIs). The design and implementation of GUIs is known in the art. By way of example, FIG. 4 provides an exemplary GUI 410 for an instructor console 160, FIG. 5 provides an exemplary GUI 510 for a student console 130, and FIG. 6 provides an exemplary GUI 610 for a query editor 250.

4. Benefits Of CRS

The ability for students to respond to open-ended questions is crucial for teaching higher-level thinking skills and for improving student writing using technology. A CRS has been tested in computer science courses to teach programming, to acquire immediate feedback about class understanding, to assess timing as student progress through activities, and to allow students to make suggestions. For example, the instructor might show a graph and ask students to make 3 relevant observations about the graph.

As students respond, CRS can display student responses anonymously in a compact form on a screen. In a few minutes, an instructor can quickly go through dozens of responses and make positive comments or suggestions for improvement. Students can also see how everyone else is doing. Student reviews are an excellent way for students to learn from others and the CRS review process appears to work much better than traditional "peer review" for a number of reasons. As students are responding, the instructor can see all of the answers coming and choose to write short reviews to students who are off track. Students can then modify their answers.

The CRS logging system allows instructor annotation of the questions, so the instructor can provide the correct answer or in the case of writing, an example of a good response. The instructor annotations appear in the student logs. In addition to the daily emails with a student's responses for one class, test systems have run the report generator on a group of logs before exams and send the students a report for that group. Students use these reports to review for the exam, since they can see the questions asked in class, their responses, reviews of their responses, and the correct answers if the instructor has provided them.

Although the foregoing has been described with respect to one or more preferred embodiments, those embodiments are not intended to limit the scope of the claims.

What is claimed is:

1. A classroom response system ("CRS") comprising:
   an instructor console programmed with a standalone instructor runtime software providing a graphical user interface to the classroom response system;
   a plurality of student consoles, each student console programmed with a standalone student runtime software providing a graphical user interface to the classroom response system;
   a classroom response system server communicatively coupled to the instructor console and the plurality of student consoles and being programmed with a plurality of software modules, including:
   a runtime server configured to be run during a class session and to provide real-time interaction between the instructor console and the student consoles, and to provide CRS functions including:
   receiving queries from the instructor console and providing the queries to the student consoles;
   receiving answers to the queries from the student consoles and providing the answers to the instructor console;
   randomly selecting an answer to one of the queries and providing the randomly-selected answer to student consoles;
   receiving a student evaluation of the randomly selected answer from the student consoles;
   providing the student evaluation to the student console that provided the answer that was evaluated;
   providing to the instructor console a visual representation of student responses;
   receiving instructor feedback from the instructor console feedback for one or more student answers, and providing the instructor feedback to the student console that sent the evaluated student answer;
   providing messaging between the instructor console and the student consoles;
   providing logging services, including logging the state of the runtime server;
   a master server configured to run continuously and to provide remote access to log files created by the runtime server and to configuration files for classroom response system; and
   a report generator configured to generate, display, save, and distribute reports based on the class session;
   a seating chart configured to:
   provide a visual representation of a classroom;
   assign each student console to a spatial position within the classroom; and
   provide hyperlinked additional information for each student, the hyperlink associated with the spatial position of the student console on the visual representation of the classroom; and
   a simulator configured to:
   emulate an instructor console;
   emulate a plurality of student consoles;
   read a log file of the runtime server, the log file including a plurality of runtime server states;
   recreate a class session based on the log file of the runtime server by processing all of the runtime server states.

2. The classroom response system of claim 1 wherein the reports of the report generator are selected from the group consisting of attendance summary, participation summary, single log summary, query report, report report, individual student attendance, individual student participation, and independent student report;
   and wherein the individual student attendance, individual student participation, and individual student report are accessible by an individual student associated with the reports, and the reports are not accessible by students.

3. The classroom response system of claim 1 wherein the simulator module is further configured to provide testing of the full classroom response system, testing of queries to be posed to students, and testing of the accuracy of a seating chart.

4. The classroom response system of claim 1 wherein the simulator module is further configured to enable an instructor to review a class session after the class session has ended, and to provide feedback to students based on the class session.

5. The classroom response system of claim 1 wherein the seating chart module is further configured to provide visual feedback of answers provided by each student console.

6. The classroom response system of claim 1 wherein at least one student console is configured to be operated in a location removed from the location of the instructor console.

7. The classroom response system of claim 1 further comprising a secondary instructor console communicatively coupled to the classroom response system server, and configured to provide a subset of the functionality of the instructor console.

8. The classroom response system of claim 7 wherein the secondary instructor console is configured with fewer administrative rights than the primary instructor console.

9. The classroom response system of claim 7 wherein the secondary instructor console is configured to be operated in a location removed from the location of the instructor console.

10. The classroom response system of claim 7 wherein the secondary instructor console is configured to simultaneously interact with a plurality of classroom response systems.

11. A server for a classroom response system ("CRS") comprising:
- a software-programmable processor;
- a network interface configured to communicatively couple the server to an instructor console and a student console; and
- a tangible storage medium having stored thereon software instructions that, when executed, instruct the processor to provide a plurality of software modules including:
- a runtime server configured to be run during a class session and to provide real-time interaction between the instructor console and the student consoles, and to provide CRS functions including:
- receiving queries from the instructor console and providing the queries to the student consoles;
- receiving answers to the queries from the student consoles and providing the answers to the instructor console;
- randomly selecting an answer to one of the queries and providing the randomly-selected answer to student consoles;
- receiving a student evaluation of the randomly selected answer from the student consoles;
- providing the student evaluation to the student console that provided the answer that was evaluated;
- providing to the instructor console a visual representation of student responses;
- receiving instructor feedback from the instructor console feedback for one or more student answers, and providing the instructor feedback to the student console that sent the evaluated student answer;
- providing messaging between the instructor console and the student consoles;
- providing logging services, including logging the state of the runtime server;
- a master server configured to run continuously and to provide remote access to log files created by the runtime server and to configuration files for classroom response system; and
- a report generator configured to generate, display, save, and distribute reports based on the class session;
- a seating chart configured to:
- provide a visual representation of a classroom;
- assign each student console to a spatial position within the classroom; and
- provide hyperlinked additional information for each student, the hyperlink associated with the spatial position of the student console on the visual representation of the classroom; and
- a simulator configured to:
- emulate an instructor console;
- emulate a plurality of student consoles;
- read a log file of the runtime server, the log file including a plurality of runtime server states;
- recreate a class session based on the log file of the runtime server by processing all of the runtime server states.

12. The classroom response system of claim 11 wherein the simulator module is further configured to provide testing of the full classroom response system, testing of queries to be posed to students, and testing of the accuracy of a seating chart.

13. A classroom response system ("CRS") comprising:
- an instructor console configured to be operated by an instructor and comprising a cross-platform standalone instructor runtime, and further comprising a plurality of software modules, including
- a simulator, a query editor, a report generator, a report creator, and a seating chart, wherein:
- the simulator is a standalone program configured to provide a full simulated system, including a plurality of instructor consoles, secondary instructor consoles, and student consoles, enabling a complete recreation of a class session;
- the query editor is configured to provide a graphical user interface for creating and viewing questions to be posed to students;
- the report generator is configured to provide a graphical user interface for interacting with reporting features of the master server, the reporting feature comprising:
- instructor-only reports, including attendance summary, participation summary, single log summary, query report, and report report; and
- student-accessible reports, including individual attendance, individual participation, and individual report;
- the report creator is configured to provide a batch interface to the reporting features of the master server; and
- the seating chart is configured to provide a customizable visual representation of the classroom, with each student assigned to a spatial position, and with additional information about a student, including biographical and photographic information, being hyperlinked to the student's spatial position on the seating chart;
- a plurality of student consoles configured to be operated by a plurality of students and comprising a cross-platform standalone student runtime;
- a secondary instructor console configured to be operated by a teaching assistant and comprising a cross-platform standalone secondary instructor runtime, the secondary instructor runtime comprising features that are a subset of the features of the instructor runtime;
- a network communicatively coupling a CRS server to the instructor console, the student consoles, and the secondary instructor console;
- the CRS server comprising a plurality of software modules, the software modules including a runtime server, and a master server;
- wherein the runtime server is configured to:
- be automatically started approximately ten minutes before a class session begins and run until approximately 15 minutes after the class finishes;
- while running, to provide real-time communication between the instructor console, the student consoles, and the secondary instructor consoles;
- log all interactions that take place on the CRS;
- forward messages between the instructor console, the secondary instructor console, and the student consoles;
- maintain an internal state of the class session;
- log all changes of state to enable the runtime server to be restarted at a later time at a point where it left off;
- record relevant reporting information in an XML file for later report generation by the report generator;
- receive formatted questions from the instructor console, the formatted questions being selected from the group consisting of true/false, multiple choice, multiple selection, open answer, and writing exercise;
- provide a formatted question to the student consoles, and receive student answers submitted from the student consoles;
- randomize at least some of the submitted answers and provide anonymized submitted answers to student consoles, along with a feedback form;
- receive answer feedback from student consoles, and provide anonymized feedback to student consoles;

receive a start discussion indicator from the instructor console, log the start discussion event, and mark as notes any student input received after the start discussion event;

receive individual messages from the instructor console along with a designation of a specific student to receive the message, and deliver the message to the specific student; and receive a help request from a student console and provide to the instructor console a notice of the help request and an identification of the student console that sent the help request;

provide an optional rapid instructor review feature which, when enabled, displays on the instructor console an indicator for each student whether that student's answer is correct or incorrect, and upon receiving a selection event for a student from the instructor console, sends a message to the selected student console indicating whether the student's answer is correct or incorrect;

provide a sharing feature wherein groups of students are enabled to work collectively, and wherein a common grade is assigned to all of the students in each group;

assign grades to each student based on the student's interactions during a class session;

provide a generic response feature wherein a common grade is assigned to all students who gave a particular response; and wherein the master server is configured to run continuously on the CRS server and provide remote access to log files created by the runtime server, provide reports via e-mail, and to provide necessary data for other software modules.

* * * * *